United States Patent [19]

Steinbach et al.

[11] Patent Number: 4,818,423
[45] Date of Patent: Apr. 4, 1989

[54] LOW TEMPERATURE LUBRICATING OIL

[75] Inventors: Hans-Horst Steinbach; Jürgen Ackermann, both of Bergisch Gladbach; Ottfried Schlak, Cologne, all of Fed. Rep. of Germany

[73] Assignee: Bayer Aktiengesellschaft, Leverkusen, Fed. Rep. of Germany

[21] Appl. No.: 170,265

[22] Filed: Mar. 18, 1988

[30] Foreign Application Priority Data

Mar. 28, 1987 [DE] Fed. Rep. of Germany ....... 3710423

[51] Int. Cl.$^4$ .......................................... C10M 107/50
[52] U.S. Cl. ..................................... 252/49.6; 528/42
[58] Field of Search ......................... 252/49.6; 528/42

[56] References Cited

U.S. PATENT DOCUMENTS

| | | | |
|---|---|---|---|
| 3,148,201 | 9/1964 | Fassnacht | 252/49.6 |
| 3,642,626 | 2/1972 | Christian | 252/49.6 |
| 3,847,961 | 11/1974 | Koshar | 252/49.6 |
| 4,324,671 | 4/1982 | Christian et al. | 252/49.6 |
| 4,537,677 | 8/1985 | Keil | 252/49.6 |
| 4,582,620 | 4/1986 | Mori et al. | 252/49.6 |

Primary Examiner—William R. Dixon, Jr.
Assistant Examiner—Jerry D. Johnson
Attorney, Agent, or Firm—Connolly and Hutz

[57] ABSTRACT

Fluorosiloxane lubricant comprising compounds corresponding to the formula $$T_a M_b D^F_c D_d$$

wherein
  T denotes alkyltrisiloxy having 1 to 12 alkyl carbon atoms,
  M denotes trialkylmonosiloxy having 1 to 12 carbon atoms in each alkyl,
  D denotes dialkylsiloxy having 1 to 12 carbon atoms in each alkyl,
  $D^F$ denotes a substituted alkyldisiloxy having 1 to 12 carbon atoms in the alkyl and substituted by a fluorinated moiety of the formula $C_n F_{2n+1}—CH_2—CH_2$, wherein
  n is a number from 2 to 10,
  a is a number from 1 to 5,
  b is a number from 3 to 7,
  c is a number from 3 to 7, and
  d is a number from 30 to 70.

7 Claims, No Drawings

LOW TEMPERATURE LUBRICATING OIL

The present invention relates to a low temperature lubricating oil based on fluorosiloxanes.

BACKGROUND OF THE INVENTION

Industrial refrigeration in the low temperature region down to about $-110°$ C. has become very widespread in recent years. A considerable proportion of this development has taken place in the field of laboratory equipment, Cryostatic temperature controls and testing chambers for the testing of materials at low temperatures. Refrigeration plants for the aforesaid temperature regions are also required to an increasing extent in medicine, chemistry and processing technology as well as steel refining and need to be designed for higher outputs.

The lubricants used in refrigeration plants have for a long time been simple mineral oils or ordinary naphthenic oils but these are unsatisfactory in many respects (unresistant to extremes of temperature and subject to wide fluctuations in viscosity).

Semi-synthetic oils, fully synthetic alkyl aromatic compounds and poly-α-olefines have brought further improvements. Synthetic liquid lubricants on a chemical basis very different from mineral oils, e.g. butyl esters of polysilicic acids, have been the result of this development. Liquid lubricants of this type, however, have a certain susceptibility to hydrolysis which may cause them to gel in the presence of water.

To use organopolysiloxanes as lubricants would be one solution to the problem of hydrolysis but it is well known that, for example, dimethylpolysiloxanes are poor lubricants even though their relationship of viscosity to temperature could afford some advantages for a liquid lubricant in low temperature installations.

Siloxanes which are substituted with phenyl, halophenyl or trifluoropropyl groups have good lubricating properties but poor viscosity/temperature relationships compared with dimethylpolysiloxane (see J. of Chem. and Engng. Data 6 (1961), 155). Although such siloxanes have been used for the preparation of high temperature lubricating fats, they have not been used as low temperature lubricants.

Lubricants which are stable over a very wide temperature range have also been disclosed in U.S. Pat. No. 3,642,626. These lubricants are polymeric fluorosilicones with a relatively high degree of polmyerization but they provide no advantages as low temperature lubricants due to their high viscosity at low temperatures. Also their preparation is complicated and costly.

To overcome this problem, a fluorine-containing siloxane of the general formula $$R_FR_2SiOSiR_2R_F$$

in which $R_F$ denotes the group $C_nF_{2n+1}-CH_2-CH_2-$ (n=1–12) has been proposed in German Pat. No. 2,750,980.

This oil may be used alone or as a mixture with known lubricants.

When this oil was subjected to technical tests, it was found to have advantages both for the preparation of low temperature lubricants and for the preparation of fats according to German Pat. No. 1,769,094. This low temperature lubricant has, however, low initial viscosity which renders it unsuitable for certain purposes for which it has been found necessary to use lubricating oils with viscosities preferablyin the class according to ISO VG 46. This means that these oils are required to have kinematic viscosities of from 41.4 to 50.6 mm$^2$/sec at 40° C.

BRIEF DESCRIPTION OF THE INVENTION

The present invention relates to a lubricant based on fluorosiloxanes, characterised in that they consist of compounds corresponding to the general formula

wherein
T denotes alkyltrisiloxy groups, in particular methyltrisiloxy groups,
M denotes trialkylmonosiloxy groups, in particular trimethylsiloxy groups,
D denotes dialkyldisiloxy groups, in particular dimethyldisiloxy groups and
$D^F$ denotes alkyldisiloxy groups, in particular methyldisiloxy groups containing a fluorinated residue of the formula $C_nF_{2n+1}-CH_2-CH_2-$ (n=2–10), and
a may have values from 1 to 5,
b may have values from 3 to 7,
c may have values from 3 to 7 and
d may have values from 30 to 70.

DETAILED DESCRIPTION OF THE INVENTION

It has been found that compounds corresponding to the general formula

are oils with good high temperature resistance and low dependence on the viscosity with temperature variations. Also, they have low solidification points which together with the excellent lubricating properties render them highly useful for lubricants in refrigerating compressors. Also, the oils have excellent solubility in conventional refrigeration agents.

A particularly preferred embodiment of the oils according to the present invention is one wherein T denotes a

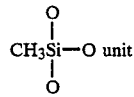

M denotes a

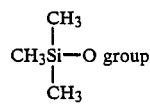

D denotes a

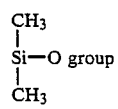

$D^F$ denotes a

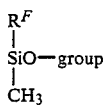

afford particular advantages when
a is preferably about 3,
b is preferably about 5,
c is preferably about 5 and
d is preferably about 50.

These compounds are branched dimethylpolysiloxane oils with all the advantages of silicone such as high temperature resistance, low dependence of the viscosity on the temperature and physiological harmlessness. By virtue of the $R^F$ groups, which may consist of $-CH_2-CH_2C_nF_{2n+1}$ in which n may have a value from 2 to 10, these oils have excellent, solubility in refrigerating agents (e.g. R12, R13, R502 or R503).

No miscibility gap with the refrigerating agents could be found down to temperatures of $-110°$ C. The cold flow resistance in DIN 51 568 U shaped tube is below $-80°$ C. The solidification point according to DIN 430 3016 is at $-92°$ C. This is sufficient to enable the substance to remain liquid under the vapour pressure of the refrigerating agent with small quantities of liquid refrigerating agent at temperatures of $-110°$ C.

The lubricating properties of these oils is eminently suitable for refrigerating compressors. Determination of the compressive strength in a 4 ball apparatus (DIN 51 350) showed the oils to have a welding load of 1,800N.

When the lubricating properties were tested by the Almen Wieland Test, the welding load at the limit of the load bearing capacity was found to be in the range of 6,500 to 8,000N and the frictional force was found to be 2,000 to 3,000N at a temperature of 69° C.

In the Reichert wear test under a load of 15N, the wear land was found to be 12 to 14 mm² and the specific load bearing capacity was found to be 23N/mm².

The viscosity index (ISO 2909) is particularly interesting. It has a value of 350. The water content (DIN 51 777) is below 30 ppm. Other noteworthy advantages are:
resistance to hydrolysis, temperature and agein,
non-corrosiveness,
defoaming properties,
not sludge forming,
no swelling of sealing material (with the exception of silicone seals), This example of properties tested in the oils characterised above surprisingly shows that the lubricating oils described are eminently suitable for the required purpose. They have a low dependence of viscosity on temperature and a very low solidification point with excellent lubricating properties. The requirements to be met by a low temperature lubricant of being readily soluble in refrigerating agents is also fulfilled by the lubricants according to this invention.

Preparation of the lubricants according to the invention is carried out in known manner by simple chemical addition of fluoroalkenes to chlorosilanes containing Si—H— groups, separation of the fluoroalkyl-substituted silanes formed, and hydrolysis of suitable quantities of fluoroalkyl-substituted silanes with a mixture of the required quantities (depending on the desired values for a, b, c and d) of methyltrichlorosilane, trimethylmonochlorosilane and dimethyldichlorosilane in a suitable inert solvent, preferably toluene.

This procedure is followed by equilibration with strong equilibration catalysts such as sulphuric acid to ensure a narrow molecular weight distribution. The end product is then neutralized (preferably with sodium hydroxide), heated in a vacuum and filtered.

The invention will now be illustrated with the aid of the following example.

EXAMPLE

A mixture of 1·47 kg of trimethylmonochlorosilane, 17·47 kg of dimethyldichlorosilane, 1·21 kg of methyltrichlorosilane and 6·22 kg of $C_6F_{13}(CH_2)_2Si(CH_3)Cl_2$ (99%) is gradually added to 60 liters of water at a temperature of 35° C. with vigorous stirring. The temperature is kept low (below 35° C.) by vigorous cooling, optionally with ice water. When all the mixture has been added, stirring is continued for 1½ hours and 6 liters of toluene are added for better phase separation.

The lower phase is separated off and the siloxane phase which contains solvent is washed twice with fresh water, each time for 15 minutes with stirring. The solvent is then removed as distillate by heating to 50° C.

25 ml of conc. $H_2SO_4$ are added to the siloxane phase and the reaction mixture is condensed at 50° to 60° C./40 mbar. The water formed in the reaction is distilled off over a period of two hours.

$H_2SO_4$ is removed by the addition of water and washed twice. 110 g of ZnO are then added and the mixture is stirred for 1 hour. The ZnO and the acids which have reacted with it are filtered off under pressure with the aid of filtering auxiliaries. The oil obtained is heated to 150° C./1 mbar. The product is adjusted to a viscosity of 40 to 50 mm²/sec (at 40° C.) with batches of a higher or lower viscosity.

The product has approximately the composition corresponding to the formula $$T_3M_5D^F{}_5D_{50}$$

The refractive index is 1·39 and the viscosity index is about 350. The other properties also conform to the specifications mentioned.

What is claimed is:
1. Fluorosiloxane lubricant comprising compounds corresponding to the formula

$$T_aM_bD^F{}_cD_d$$

wherein
T denotes alkyltrisiloxy having 1 to 12 alkyl carbon atoms,
M denotes trialkylmonosiloxy having 1 to 12 carbon atoms in each alkyl,
D denotes dialkyldisiloxy having 1 to 12 carbon atoms in each alkyl,
$D^F$ denotes a substituted alkyldisiloxy having 1 to 12 carbon atoms in the alkyl and substituted by a fluorinated moiety of the formula $C_nF_{2n+1}—CH_2—CH_2$,
wherein n is a number from 2 to 10,
a is a number from 1 to 5,
b is a number from 3 to 7,
c is a number from 3 to 7, and
d is a number from 30 to 70.
2. Fluorosiloxane lubricant according to claim 1, wherein a is about 3, b is about 5, c is about 5 and d is about 50.

3. Fluorosiloxane lubricant according to claim 1 wherein T is a methyltrisiloxy moiety.

4. Fluorosiloxane lubricant according to claim 1 wherein M is a trimethylsiloxy moiety.

5. Fluorosiloxane lubricant according to claim 1 wherein D is a dimethyldisiloxy moiety.

6. Fluorosiloxane lubricant according to claim 1 wherein $D^F$ is a moiety of the formula

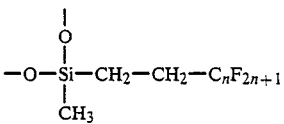

wherein n is a number from 2 to 10.

7. Fluorosiloxane lubricant of the formula $$T_a M_b D^F_c D_d$$

wherein
T is amethyltrisiloxy moiety,
M is a trimethylsiloxy moiety,
D is a dimethyldisoloxy moiety,
$D^F$ is a substituted methyldisiloxy moiety substituted by $C_n F_{2+1}$—$CH_2$—$CH_2$ wherein
n is a number from 2 to 10,
a is a number from 1 to 5,
b is a number from 3 to 7,
c is a number from 3 to 7, and
d is a number from 30 to 70.

* * * * *